United States Patent [19]
Tanabe et al.

[11] Patent Number: 4,657,366
[45] Date of Patent: Apr. 14, 1987

[54] SHUTTER DEVICE FOR CAMERA

[75] Inventors: Yoshiaki Tanabe, Tokyo; Akira Katayama, Koganei; Masanori Hasuda, Yokohama, all of Japan

[73] Assignee: Nippon Kogaku K.K., Tokyo, Japan

[21] Appl. No.: 854,886

[22] Filed: Apr. 23, 1986

[30] Foreign Application Priority Data

Apr. 30, 1985 [JP] Japan .................................. 60-93462
Apr. 30, 1985 [JP] Japan .................................. 60-93463

[51] Int. Cl.⁴ .............................................. G03B 9/40
[52] U.S. Cl. .................................... 354/246; 354/249
[58] Field of Search ...................... 354/234.1, 246, 248, 354/249, 250, 252

[56] References Cited

U.S. PATENT DOCUMENTS

| 4,081,810 | 3/1978 | Onda et al. ........................... 354/246 |
| 4,096,505 | 6/1978 | Onda et al. ........................... 354/246 |
| 4,110,772 | 8/1978 | Nakagawa et al. .................. 354/246 |
| 4,245,905 | 1/1981 | Takayama ............................ 354/246 |
| 4,268,147 | 5/1981 | Date .................................... 354/246 |
| 4,302,091 | 11/1981 | Harase et al. ....................... 354/246 |
| 4,407,574 | 10/1983 | Tomino et al. ................. 354/246 X |
| 4,458,998 | 7/1984 | Tanaka et al. ...................... 354/154 |

FOREIGN PATENT DOCUMENTS 54-66847  5/1979  Japan .

Primary Examiner—A. A. Mathews
Attorney, Agent, or Firm—Shapiro and Shapiro

[57] ABSTRACT

A focal plane shutter for camera comprises an opening blade group and a closing blade group, an opening blade-driving member and a closing blade-driving member, an exposure operation means for moving said blade-driving members for exposure operation, a braking member for changing the position from an initial position while absorbing the kinetic energy of the moving closing blade-driving member and resetting means for moving the blade-driving members and the braking member after completing the exposure operation.

10 Claims, 12 Drawing Figures

SHUTTER DEVICE FOR CAMERA

BACKGROUND OF THE INVENTION

1. Field of the Invention

The present invention relates to a shutter device for camera and more particularly to a focal plane shutter of the type which is provided with a group of opening blades and a group of closing blades and is able to cover all the area of an exposure aperture by combinations of those blades.

2. Related Background Art

One of the most important problems involved in the known focal plane shutter with an opening blade group and a closing blade group is the break-out of light through between the shutter blades.

In order to more perfectly shut the exposure aperture from light, U.S. Pat. No. 4,407,574 has already proposed to arrange an additional shutter member in front of the shutter blades. Also, U.S. Pat. No. 4,245,905 has disclosed a novel structure of focal plane shutter in which the aperture is shut from light double by the opening blade group and by the closing blade group before and after every film exposure.

On the other hand, improvements in means for braking the shutter mechanism have been proposed. For example, Japanese Utility Model application laid open No. 66,847/1979 has disclosed a focal plane shutter provided with a braking device which acts on means for driving the shutter blades to damp the shock at the end of running of the shutter blades. This braking device has a rotatable braking member which is set in a suitable position for receiving the moving shutter blade-driving means. After receiving the driving means, the braking member rotates while applying a brake on the driving means. After completing an exposure, the braking member is returned to the set position together with the shutter blade-driving means.

Some attempts have been made to apply the braking device to the above-mentioned focal plane shutter of double shut-up construction. However, all of the attempts have led to the conclusion that the double shut-out construction and the braking device can not be combined in a simple manner by the conventional combination technique. This is because, in the latter-mentioned device, the shutter-driving member is reset simultaneously with resetting of the braking member after exposure.

As another damping means for shutter blades, there is known such a device using a balance weight or counterweight which is moved in a direction approximately opposite to the running direction of the shutter blades as disclosed in U.S. Pat. No. 4,458,998. This prior art technique has a drawback of poor reliability. In the device, a common member is used for locking the shutter blades in the set position and also for locking the balance weight in the start position. Because of it, if there occurs any change in the motion of the locking member due to change of atmosphere such as temperature or if the balance weight is rendered inactive by accident, the exposure time is directly affected by it.

SUMMARY OF THE INVENTION

Accordingly, the principal object of the invention is to provide a focal plane shutter which has a double shut-up construction and which is able to apply a brake on the shutter blades at a time point close to the running end of the blades.

It is another object of the invention to provide a shutter device in which, even after the shutter blade driving member is returned to a set position not to interfere with the resetting operation of the braking member after exposure, at least the boundary areas between blades of the opening blade group now covering the exposure aperture can be covered further by the closing blade group in the fashion of double shut-up manner.

It is a further object of the invention to provide a focal plane shutter in which the exposure time is free from the affection of variation in operational condition of the balance weight.

Other and further objects, features and advantages of the invention will appear more fully from the following description taken in connection with the accompanying drawings.

DESCRIPTION OF PREFERRED EMBODIMENT

In all of FIGS. 1 to 8 showing an embodiment of the invention, the shutter is in the position before releasing the shutter.

Figure 1:
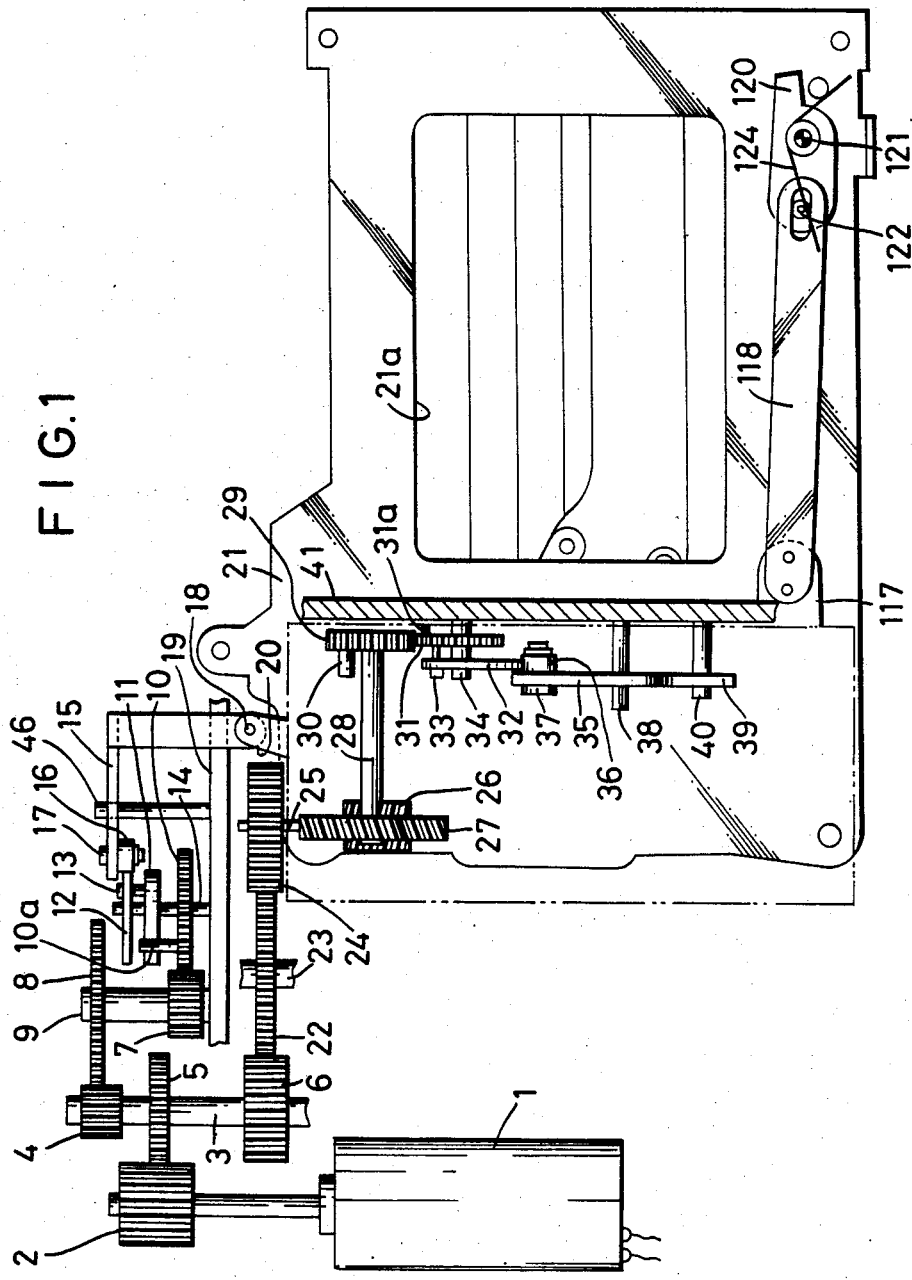
FIG. 1 is a front view of a shutter device showing an embodiment of the present invention.

Referring first to FIG. 1, there is shown a camera housing. A motor 1 is fixed to the camera housing. Fixedly mounted on the output shaft of the motor 1 is a gear 2 which is in mesh with a transmission gear 5. The shaft 3 of the gear 5 is rotatably supported on the camera housing. Gears 4 and 6 are also mounted on the shaft 3 for rotation together with the gear 5. The gear 4 is in mesh with a gear 8 which is in turn connected with a gear 7 through a shaft 9. The shaft 9 is rotatably supported on a base plate 19 fixed to the camera housing at suitable fastening points not shown.

Figure 2:
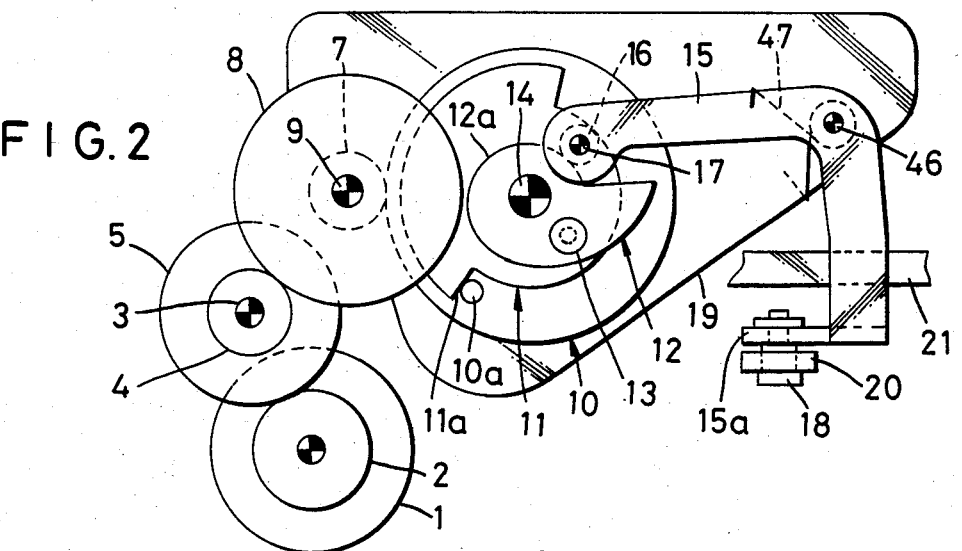
FIG. 2 is a partial plan thereof.

FIG. 2 is a view from above of FIG. 1 embodiment.

A shaft 14 is fixed on the above-mentioned base plate 19. The shaft 14 has cams 11, 12 and a gear 10 rotatably mounted thereon. The two cams 11 and 12 are united together by a pin 13. The gear 10 is in mesh with the gear 7 and has a stud pin 10a thereon. The pin 10a is in a position to abut against a stepped portion 11a of the cam 11.

A further shaft 46 is fixed on the base plate 19. The shaft 46 supports a lever 15 for rotation about the shaft. The lever 15 is under the bias force of a spring 47 which intends to rotate the lever counter-clockwisely. Standing from one end portion of the lever 15 is a stud pin 17 which supports a roller 16 for rotation about the pin. Under the biasing force of the spring 47, therefore, the roller 16 is forced to abut against a cam surface 12a of the cam 12. Another end portion of the lever 15 is curved to form an angled portion 15a having a pin 18 which is in engagement with a shutter-charging lever 20.

Referring again to FIG. 1, a gear 22 is in mesh with the above-mentioned gear 6. The gear 22 can rotate a worm 26 through the shaft 25 of a gear 24. Although not shown in the drawing, the shaft 23 of the gear 22 and the common shaft 25 of the gears 24 and 26 are rotatably supported on the camera housing. The rotation of the worm 26 is converted into a 90 deflected rotation by a worm wheel 27 and then transmitted to a gear 29. The gear 29 has a stud pin 30. The worm wheel 27 and the gear 29 are connected by a shaft 28 rotatably supported on a base plate 41 of the mirror box of the camera.

Figure 3:
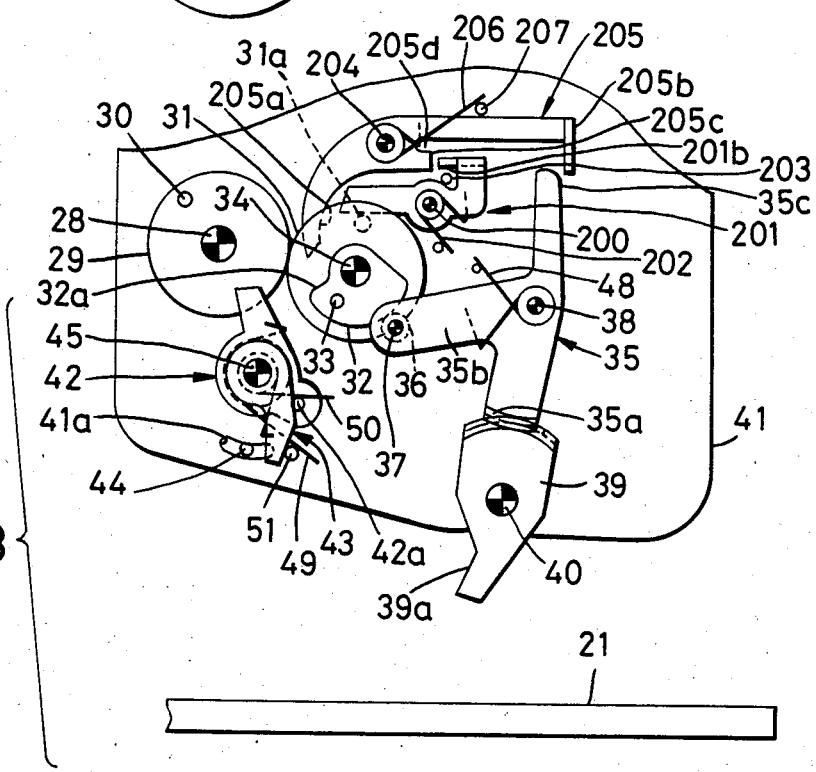
FIG. 3 is a partial left side view thereof.

FIG. 3 is a view from the left-hand side of FIG. 1 embodiment.

As seen in FIG. 3, on the above-mentioned base plate 41 there is a shaft 34 supporting a gear 31 and a cam 32 for rotation about the shaft. The gear 31 is in mesh with the gear 29. A pin 33 connects the gear 31 and the cam 32 together. The gear 31 has a stud pin 31a on its lower surface.

On the base plate 41 there is a further shaft 38 for rotatably supporting a lever 35 which has an end formed as a sector gear 35a and two arms 35b and 35c. The arm 35b has a stud pin 37 on which a roller 36 is mounted for rotation. The lever 35 is under the action of biasing force of a spring 48 which intends to rotate the lever 35 clockwise. Therefore, the roller is forced to abut against a cam surface 32a of the cam 32.

The base plate 41 has still a further shaft 40 for rotatably supporting a sector gear 39 which is in engagement with the sector gear 35a of the lever 35. The lower end of the sector gear 39 is shaped into a pawl 39a protruding toward a shutter base plate 21.

Also provided on the base plate 41 is a shaft 45 for supporting levers 42 and 43 for rotation about the shaft. The lever 42 has a stud pin 42a in abutment with the lever 43 under the action of clockwise biasing force of a spring 50. Further, a spring 49 is provided which biases the lever 42 to a counter-clockwise rotation. Under the biasing force of the spring 49 the lever 43 is forced to abut against a stud pin 51 on the base plate 41.

The base plate 41 has an arc-shaped slot 41a through which a pin 44a projects up from the base plate. The pin 44 is connected with a moving mirror (not shown) and lies in the locus of rotation of the lever 43.

Also fixed on the base plate 41 are shafts 200 and 204 for rotatably supporting levers 201 and 205 respectively. The lever 201 is under the action of a spring 202 which intends to the lever 201 counter-clockwisely. However, the counter-clockwise rotation of the lever 201 is limited by the pin 31a engaging with one end of the lever 201. Similarly, the lever 205 is biased by a spring 206 to counter-clockwise rotation which is, however, limited by a stop pin 207 fixed on the base plate 41. In this position, one end 205a of the lever 205 lies in the locus of rotation of the pin 31a. To limit the rotation of the lever 201 instead of the pin 31a, there is provided also a stop pin 203 fixed on the base plate.

The phantom in FIG. 1 suggests a shutter driving and limiting mechanism which will hereinafter be described in detail by reference with FIGS. 4 and 5.

Figure 4:
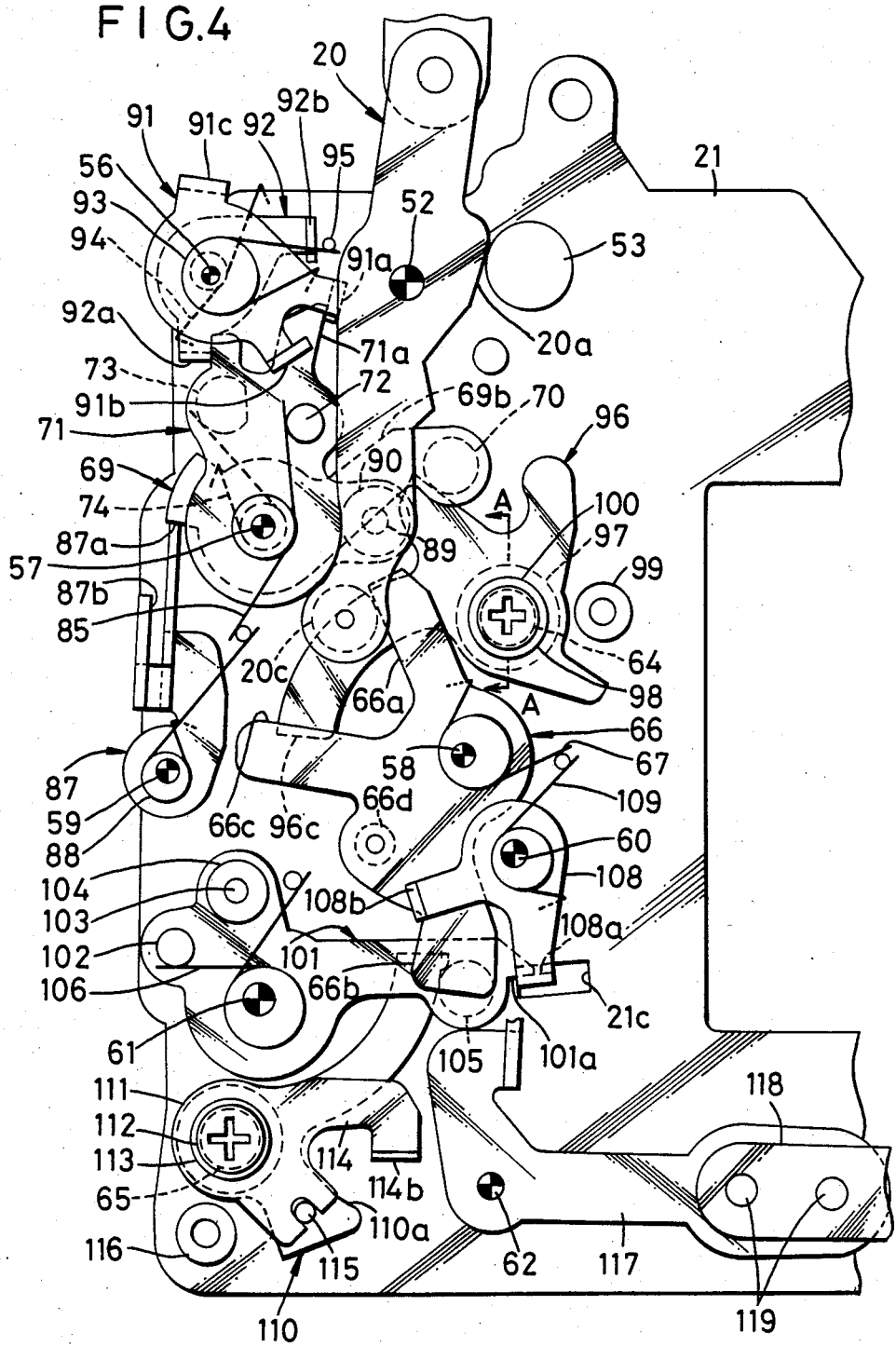
FIG. 4 is a front view of the mechanism suggested by phantom in FIG. 1.

In FIG. 4, the shutter-charging lever 20 previously mentioned is mounted on a shaft 52 for rotation about the shaft. The shaft 52 is supported on the base plate 21.

On one end of the lever 20 is a roller 20c which is rotatable about its axis. A shaft 58 on the base plate supports a charge cam 66 which is under the action of a bias spring 67 intending to rotate the cam counter-clockwisely. By this biasing force, an arm 66a of the cam 66 is urged to push the roller 20a so that the lever 20 is subjected to a biasing force intending to rotate the lever 20 clockwisely. Consequently, the side surface 20a of the lever 20 is abutted against a fixed pin 53 for positioning the lever 20.

A shaft 57 supports levers 69 and 71 for rotation about the shaft. The two levers are under the action of a spring 74 which intends to rotate the lever 69 counter-clockwisely and the lever 71 clockwisely. The lever 69 has a stud pin 70 which is in engagement with a closing blade group, passing through an arc-shaped slot 21b formed in the base plate 21.

Figure 6:
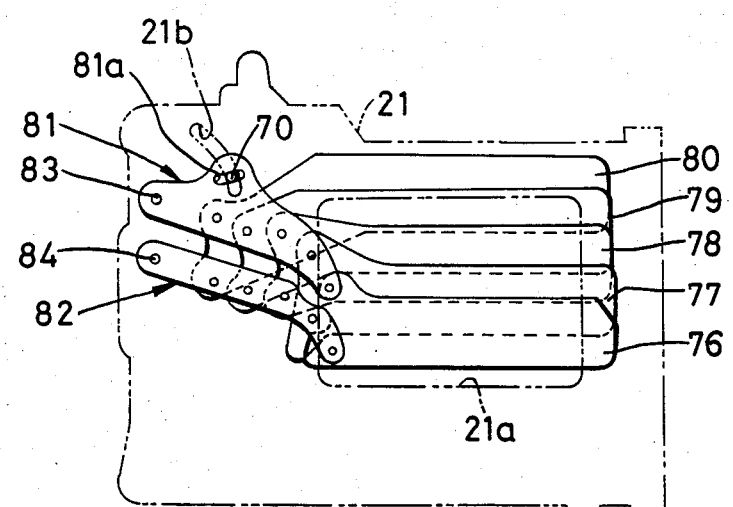
FIG. 6 is a view showing the manner of expansion of the closing blade group.
Figure 7:
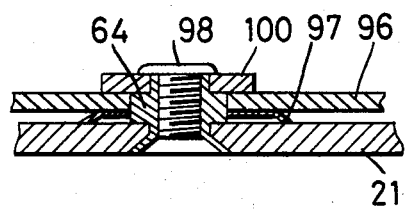
FIG. 7 is a sectional view taken along the line A—A and looking in the direction of arrow.

FIG. 6 shows the manner of engagement between the pin 70 and the closing blade group.

The closing blade group consists of a slit-forming blade 76 and shutter blades 77, 78, 79, 80. Each the blade is connected with a driving arm 81 and a driven arm 82 by pins and rotatable about the pins. The arms 81 and 82 are rotatable about shafts 83 and 84 respectively. The shafts 83 and 84 are fixed on the backside surface of the base plate 21. Therefore, the closing blade group can move in the fashion of well-known parallel link motion. A slot 81a is provided in the arm 81. The above-mentioned pin 70 is engaged in the slot 81a in the fashion of pin-slot engagement. When the pin 70 is in the position shown in FIG. 4, the closing blade group does not completely cover the aperture 21a. As seen in FIG. 6, the lower end portion of the aperture is left open in the position.

Referring again to FIG. 4, the lever 69 is under the action of the spring 74 intending to rotate the lever 69 counter-clockwisely, but the counter-clockwise rotation is limited by the top end portion 87a of a lever 87 which is mounted rotatably about a shaft 59 and under the action of a spring 88 intending to rotate the lever 87 clockwisely.

On the upper side surface of the lever 71 there are stud pins 72 and 89 whereas on the under side there is a stud pin 73. A charge roller 90 is rotatably mounted on the pin 89. The pin 73 is in the position to abut against the side surface 69b of the lever 69. Further, the lever 71 is biased by a spring 85 which intends to rotate the lever 71 clockwisely. But, the clockwise rotation is limited by an angled portion 91a of a locking lever 91 engaging with a projected end 71a of the lever 71.

The lever 91 and a lever 92 are mounted on a common shaft 56 for rotation about the shaft and biased by springs 93 and 94 respectively. The spring 93 intends to the lever 91 clockwisely whereas the spring 94 intends to rotate the lever 92 counter-clockwisely. But, the biasing force of the spring 93 is limited by an angled portion 91c of the lever abutting against the base plate 21. The biasing force of the spring 94 is limited an angled portion 92a of the lever 92 abutting against the lever 71.

A brake lever 96 is supported by a pin 64 for rotation. As seen best in FIG. 7, a dish-shaped plate spring 97 is disposed between the lever 96 and the base plate 21. By screwing a nut 98 in the spring through a washer 100, the dish-formed leaf spring 97 is deformed to generate a frictional torque in the lever 96. In this manner, there is formed a brake for the closing blade group.

Immediately before the end of running of the closing blade group, the pin 70 on the lever 69 pushes the lever 96 thereby applying a brake on the lever 69. The rotation of brake lever 96 is limited by a rubber stopper 99.

A lever 101 rotatable about a shaft 61 has a stud pin 102 and a stud shaft 103 on the upper side. A charge roller 104 is rotatably mounted on the shaft 103. On the under side, the lever 101 has also a stud pin 105. The lever 101 is under the action of a spring 106 which intends to rotate the lever clockwisely. But, the clockwise rotation of the lever 101 is limited by its projection 101a abutting against an angled portion 108a of a lock lever 108.

The lock lever 108 is rotatable about the shaft 60 and is biased by a spring 109 intending to rotate the lever clockwisely. The angled portion 108a of the lock lever is movable within a slot 21c formed in the base plate 21.

Another brake lever 110 is provided rotatably about a shaft 65. Like the above-described brake lever 96, in the brake lever 110, a frictional torque is produced by fastening a screw 112 into a dish leaf spring 111 through a washer 113 to deform the dish spring. Thus, there is formed also a brake for an opening blade mechanism.

The shaft 65 supports also a lever 114 for rotation about the shaft. This lever 114 and the above-mentioned lever 110 are connected by a pin 115 and moved together. A rubber stopper 116 limits the rotation of these levers 110 and 114. Rotatably mounted on a shaft 62 is a lever 117 having a balancer weight 118 (cf. FIG. 1) connected to the fore end of the lever by pins 119. As seen in FIG. 1, the balancer weight 118 has a slot formed at the free end. A pin 122 is engaged in the slot. The pin 122 is a pin studded on a lever 120 which is in turn mounted rotatably about a stud pin 121 standing from the base plate 21. A spring 124 is disposed on the pin 122 to bias the lever 120 to rotate clockwisely.

Figure 8:
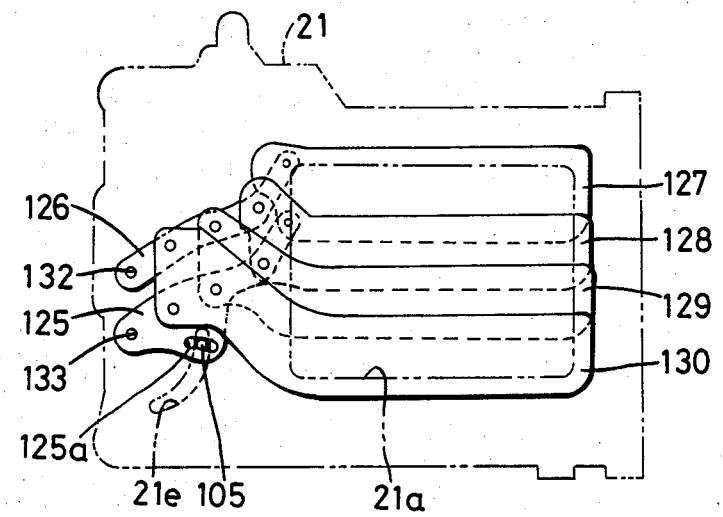
FIG. 8 shows the manner of expansion of the opening blade group.

Referring to FIG. 8, it is seen that the stud pin 105 on the lever 101 engages with the opening blade group and passing through the arculate slot 21e formed in the base plate 21 the pin 105 further engages in an elongate slot 125a formed on a driving arm 125. The driving arm 125 and a driven arm 126 are rotatably mounted on stud pins 132 and 133 on the backside surface of the base plate 21 respectively. A slit-forming blade 127 and shutter blades 128-130 are rotatably supported on the arms. Like the above-mentioned closing blade group 76-80, this opening blade group 127-130 is so constructed as to execute the well-known parallel link motion.

Figure 5:
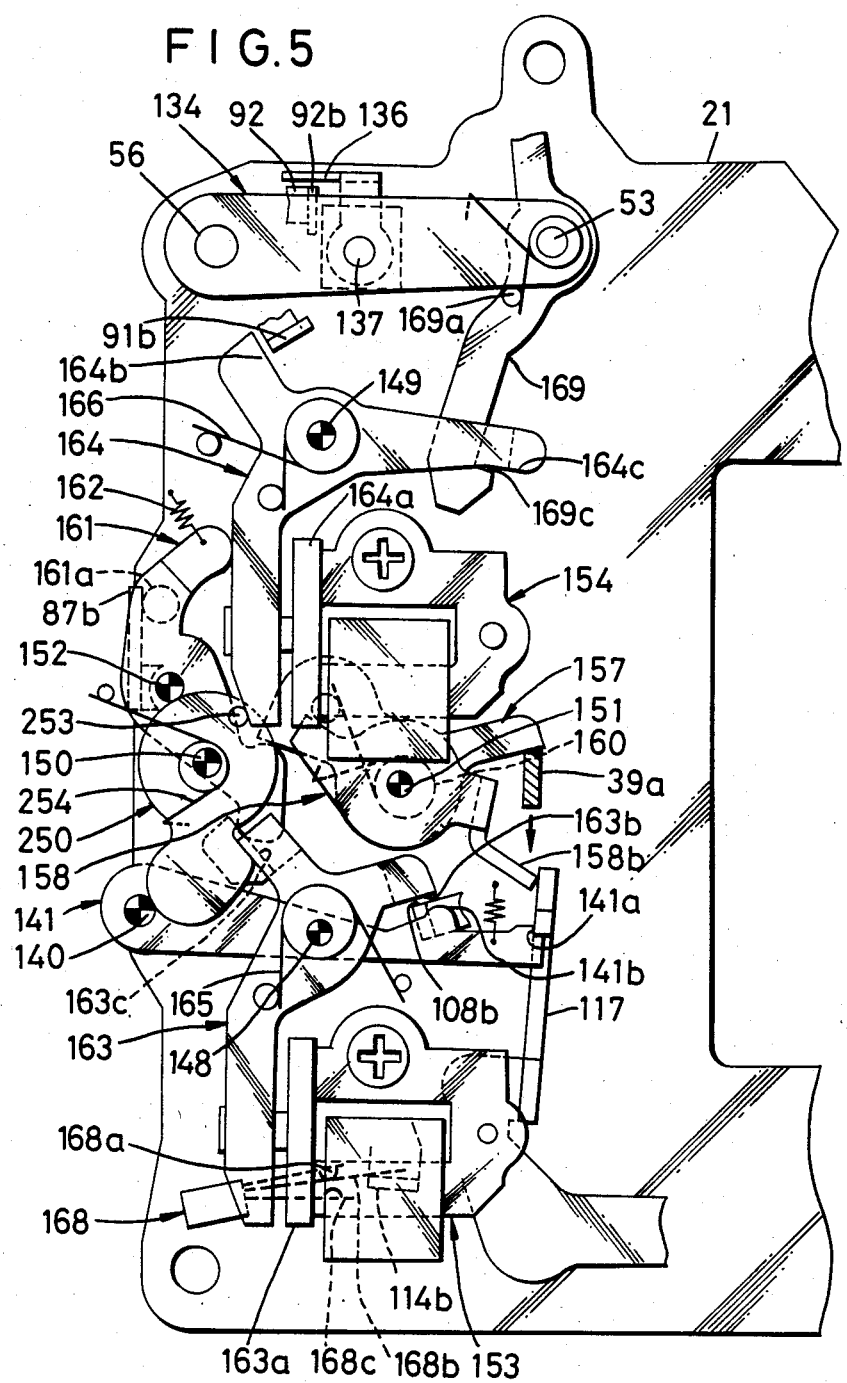
FIG. 5 is a front view similar to FIG. 4.

FIG. 5 is a view showing the members previously shown in FIG. 4 in a further detailed form. Like reference numerals to FIG. 4 represent the same members.

Reference numeral 134 designates a second base plate which is supported by shafts 53 and 54. On the second base plate, a pin 137 supports a signal contact 136 through an insulating plate. The signal contact is in the position to contact with the curved portion 92b of the lever 92. Although not shown in the drawing, a third base plate is provided at a position spaced from the second base plate. Fixed on the third base plate is a shaft 140 on which a lever 141 is rotatably mounted. The lever 141 is under the action of a spring intending to rotate the lever counter-clockwisely. At a position further upwardly spaced from the third base plate there is provided a fourth base plate not shown. Fixedly mounted on the fourth base plate are first and second magnets 153 and 154. The fourth base plate has also a shaft 151 on which a charge input lever 157 and a charge lever 158 are rotatably mounted. A spring 160 biases the levers 157 and 158 in opposite directions to each other. Another charge lever 161 is rotatably mounted on a shaft 152 and biased toward a counter-clockwise rotation. In the position shown in FIG. 5, a pin 161a projected from the lever 161 is in abutment on the curved portion 87a of the lever to limit the clockwise rotation of the lever against the biasing force of the spring 88. Furthermore, the lower end of the lever 161 is in abutment against a side surface 163 of an armature lever 163 to limit the rotation of the lever. Similarly, the upper end of the lever 166 limits the rotation of a second armature lever 164. In addition, at a middle shoulder portion, the lever 161 is in engagement with the lever 158, which limits the counter-clockwise rotation of the lever 161.

The armature levers 163 and 164 are rotatably mounted on shafts 148 and 149 and biased toward clockwise rotation by springs 165 and 166 respectively. A switch 168 is fixed on the fourth base plate. The switch 168 comprises contacts 168a, 168b and 168c. The contacts 168a and 168b constitute a power source switch for light-measuring circuit. The contacts 168b and 168c constitute a synchronous signal contact for flash light device. In the position shown in FIG. 5, the power source switch for light-measuring circuit is ON whereas the synchronous signal contact is OFF.

A lever 250 is mounted for rotation about a shaft 150 and is under the action of a spring 254 which intends to rotate the lever counter-clockwisely. The lever 250 has a stud pin 253 on the upper side surface. The pin 253 is in contact with the armature lever 164. On the other hand, an arculate shoulder of the lever 250 is in contact with an arm of the armature lever 163. A further lever 169 is mounted for rotation about the shaft 53 and is biased by a spring intending to rotate the lever clockwisely. The lever 169 has a stud pin 169a which can engagement with the base plate 134 to limit the rotation of the lever 169 against the biasing force of the spring.

The manner of operation of the above embodiment is as follows:

As previously noted, the position of the embodiment shown in all of FIGS. 1 to 8 is that immediately before releasing the shutter.

For one shot picture-taking, the pin 10a shown in FIG. 2 and the pin 30 shown in FIG. 3 rotate 180° at first counter-clockwisely and provisionally stops at the rotated position to drive the shutter blades for film exposure. After that, the pins 10a and 30 rotate 180° clockwisely to return to the starting position. However, the rotation of the pins does not stop at the position, but the pins continue rotating further 360° and then finally stop rotating at the starting position shown in the drawings. With these rotational movements of the pins 10a and 30, a cycle of one shot taking operation is completed. This one shot taking operation will be further described stepwisely with reference to FIGS. 1 to 8.

In the shown starting position, the operator depresses a shutter release button not shown. Thereby the motor 1 starts rotating clockwisely in FIG. 2. The rotation of the motor 1 is transmitted to the gear 10 through the gear train as previously described. The gear 10 now rotates counter-clockwisely. During this counter-clockwise rotation of the gear 10, the cams 11, 12 and the lever 15 remain stationary and, therefore, the charge lever 20 also continues to be inactive.

On the other hand, the rotation of the motor 1 is transmitted also to the gear 29 through the other gear train 6, 22, 24, 26, 27 shown in FIG. 1. The gear 29 now rotates counter-clockwisely in FIG. 3. The pin 30 on the gear 29 drives the lever 42 in rotating clockwisely against the force of the spring 49. The lever 43 is pused by the pin 42a and starts rotating also clockwisely to move the pin 44 leftwards by the side surface of the lever abutting against the pin. Since the pin 44 is interlocked with a moving mirror not shown, the mirror is moved to a retracted position out of the optical path of the taking light.

At the same time, the rotation of the gear 29 is transmitted also to the cam 32 through the gear 31. The cam 32 starts rotating clockwisely and the roller 36 moves rolling along the cam surface 32a. The lever 35 rotates clockwisely under the action of the spring 48. Accordingly, the gear 39 rotates counter-clockwisely. The pawl 39a of the gear 39 is moved in the direction indicated by the arrow in FIG. 5.

Also, the pin 31a rotates clockwisely at the step. Therefore, the lever 201 is rotated counter-clockwisely by the force of the spring 202. The lever 201 stops rotating at the time when the angled portion 201b abuts against the angled portion 205c.

Since the pawl 39a limiting the rotation of the lever 157 has been retracted as previously indicated by the arrow in FIG. 5, the lever 158 is also retracted to allow the lever 161 to rotate counter-clockwisely by the biasing force of the spring 162. As the result of this rotation, the levers 163 and 164 are disengaged from the lever 161. However, it is noted, that, during the time of from the depression of the shutter release button to the start of the rotation of the lever 161, an electric current is being applied to the first and second magnets 153 and 154 to keep the armatures 163a and 164a attracted.

When the middle shoulder portion of the lever 161 comes into contact with the lever 158, the latter is pushed and starts rotates together with the lever 157 clockwisely. Also, at the time, the balancer lever 117 is disengaged from the arm 158b of the lever 158 and the balancer lever 117 is locked by the pawl 141a of the lock lever 141.

On the other hand, the pin 161a pushes also the angled portion 87b leftwards. Therefore, the lock lever 87 in FIG. 4 rotates counter-clockwisely against the force of the spring 88. Thereby, the lever 69 is disengaged from the fore end 87a of the lock lever. The lever 69, therefore, starts rotating counter-clockwisely by the force of the spring 74. The rotation of the lever 69 is stopped when its side surface 69a abuts against the pin 73. As a result of it, the pin 70 moves up along the slot 21b in FIG. 6. The closing blade group 76-80 is moved upwards from the position in FIG. 9A to the retracted position out of the aperture. Thus, the closing blade group takes the start position shown in FIG. 9B. At this step, the motor stops.

At the time, the pin 10a is in the position 180° rotated counter-clockwisely from the position shown in FIG. 2. The pins 30 and 31a are in the positions 180° rotated counter-clockwisely and clockwisely respectively from the positions shown in FIG. 3.

Figures 9A, 9B, 9C, 9D:
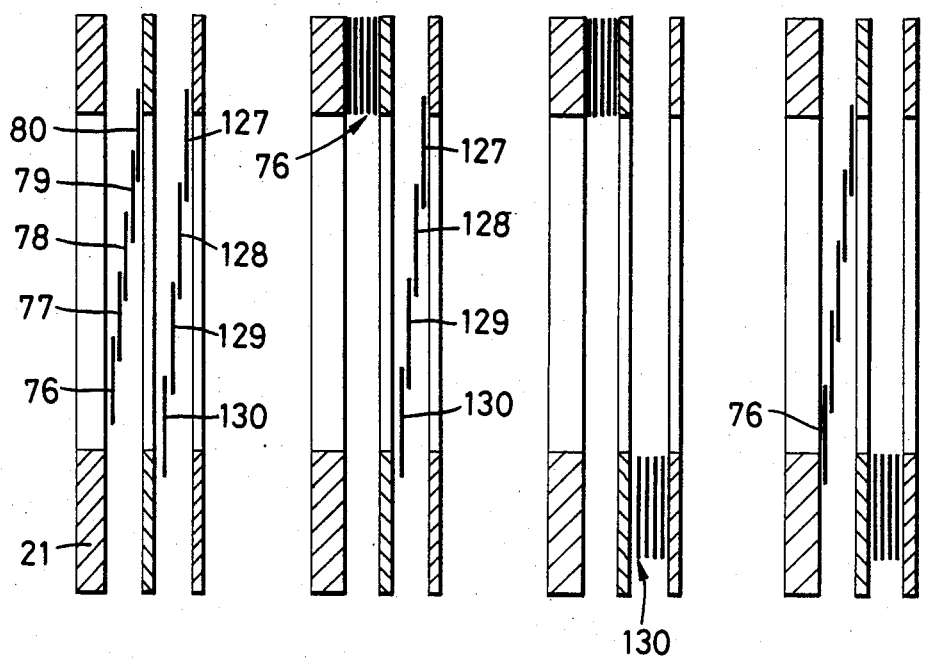
FIGS. 9A, 9B, 9C and 9D are sectional views of the opening blade group and the closing blade group in different positions.

Then, the current flowing to the magnet 153 is cut out to allow the armature lever 163 to rotate clockwisely under the action of the spring 165. The arm 163b of the armature lever pushes the angled portion 108b of the lock lever 108. Thereby the engaging portion 101a of the lever 101 is disengaged from the angled portion 108b of the lock lever as shown in FIG. 4. Now, the lever 101 starts rotating clockwisely by the force of the spring 106. The pin 105 moves down along the slot 21e shown in FIG. 8 and, therefore, the opening blade group 127-130 moves downwards to open the aperture (FIG. 9c).

Also, the clockwise rotation of the armature lever 163 allows the lever 250 to rotate counter-clockwisely under the action of the spring 254. The pin 253 on the lever 250 serves to set always a determined time difference between the armature levers 163 and 164. This prevents the opening and closing blade groups from overlapping each other in running.

Referring again to FIG. 5, the armature lever 163 continues rotating and, after the above disengagement of the engaging portion 101a from the angled portion 108b, the armature lever pushes the lever 141 at its projection 141b. Thereby, the lever 141 is rotated clockwisely to disengage the balancer lever 117 from the lock portion 141a. At the moment, the balancer weight 118 begins to move up under the action of the spring 124 (FIG. 1).

In this manner, the downward movement of the opening blade group from the position shown in FIG. 8 (shutter-opening motion) and the upward movement of the balancer 118 are balanced. As to be balancer lever 141, it is to be noted that the balancer lever releases the lever 117 from lock after the lever 101 has completely been released from the lock 108.

At a time point close to the running end of the opening blade group, the pin 105 abuts against the side surface 110a of the brake lever 110 and pushed it to rotate the brake lever 110 clockwisely about the axis 65. With this rotation of the brake lever, a frictional force is produced by the dish-shaped plate spring 111. As a result of it, a brake is applied to the moving pin 105. At this step, the lever 114 also rotates clockwisely together with the brake lever 110. The angled portion 114b of the lever 114 moves, therefore, downwardly in the plane of FIG. 5. The contact 168b moves, by its own spring force, to a position in which the power source switch for light-measuring circuit is non-conductive and the synchronous signal contact is conductive.

Upon the lapse of a predetermined exposure time, the current to the magnet 154 is cut off to allow the clockwise rotation of the armature lever 164 by the force of the spring 166. With this rotation of the armature lever 164, its arm 164b pushes the angled portion 91b of the lock lever 91. Thereby the lock lever 91 rotates counter-clockwisely against the force of the spring 93 (FIG. 4) and the engaging portion 71a of the lever 71 is disengaged from the angled portion 91a of the lock lever 91.

Upon the disengagement, the lever 71 is rotated clockwisely by the spring 85. At the time, the return lever 69 is also pushed by the pin 73. The return lever 69 rotates in the same direction, namely clockwisely and the pin 70 moves downwards along the slot 21b. The closing blade group starts running. With the clockwise rotation of the lever 71, the lever 92 also rotates counter-clockwisely under the action of the spring 94. The angled portion 92b of the lever 92 comes into contact with the contact 136 thereby generating a signal informing of the start of running of the closing blade group. At a time point close to the running end of the closing blade group, the pin 70 abuts against the brake lever 96 and pushes it. Thereby, a brake is applied in the same manner as previously described for the opening blade group. FIG. 9D shows the shutter blades in the position at the end of running of the closing blade group.

When one shot exposure is completed, the motor starts rotating counter-clockwisely in response to a signal from a control circuit not shown. The gear train system shown in FIG. 2 rotates the gear 29 until the pin 10a abuts against the cam side surface 11a (during a 180° rotation up to the return to the starting position shown in FIG. 2). Since the direction of rotation of the motor this time is opposite to that previously described, the lever 43 rotates counter-clockwise under the action of the spring 49 in FIG. 3 and, therefore, the pin 44 is also returned back to the starting position (the position shown in FIG. 3) thereby returning the moving mirror to the position for viewing.

Also, the pawl 39a in FIG. 5 is moved in the direction opposite to the arrow. The lever 157 is pushed by the pawl 39a and is rotated counter-clockwisely. Under the action of the spring 160, the lever 158 rotates together with the lever 157. The arm 158b of the lever 158 pusehs the balancer lever 117 rightwards to charge the balancer 118. That is to say, the balancer 118 is returned to the position shown in FIG. 1.

On the other hand, the lever 158 pushes the lever 161 to rotate the latter clockwisely against the biasing force of the spring 162. The lower end of the lever 161 pushes the lever 163 and the upper end pushes the lever 164. Thereby, the armature levers 163 and 164 are charged against the force of the springs 165 and 167. Furthermore, since the pin 161a moves rightwards, the lever 87 is rotated clockwisely by the spring 88 in FIG. 4 and the fore end 87a of the lever returns to the position for engagement with the lever 69.

At this step, the pins 10a, 30 and 31a return to their starting positions shown in FIGS. 2 and 3. But, the motor continues rotating further to wind up the film and charge the shutter.

During the further rotation of the motor, the pin 10a pushes the cam side surface 11a to rotate the latter clockwisely. Therefore, the cams 11 and 12 rotate, as a unit, clockwisely. Thereby, the lever 15 is moved clockwisely against the force of the spring 47. The lever 20 is moved leftwards. This movement of the lever 20 is, if viewed in the plane of FIG. 4, a counter-clockwise rotation about the shaft 52. The roller 20c, therefore, rotates the cam 66 clockwisely against the force of the spring 67. Consequently, the cam surface 66b pushes the roller 104 to rotate the lever 101 counter-clockwisely against the force of the spring 106. The lever 101 is rotationally moved until its engaging portion 101a has got over the angled portion 108a. Thus, the aperture is closed by the opening blade group 127-130 as seen in FIG. 9A. At this step, also the pin 105 pushes the side surface of the brake lever 110 to rotate it counter-clockwisely. As a result of it, the brake on the opening blade mechanism is reset.

On the other hand, the arm 66c of the cam 66 pushes the roller 90 so that the lever 71 is rotated counter-clockwisely against the force of the spring 71. The lever 69 under the action of the spring 74 rotates together with the lever 71 during only a first portion of the rotation of the latter. When the pin 70 reaches the position in which it does not obstruct the resetting of the brake for the closing blade mechanism, the rotation of the lever 69 is limited by the fore end 87a of the lever 87. The lever 69 can not rotate further from the point. The lever 71 alone continues the counter-clockwise rotation until its engaging portion 71a has got over the angled portion 91a. At the time, the closing blade group 76-80 engaging with the pin 70 is still in the position for shuttering the aperture except the lower portion as shown in FIG. 9A. The brake on the closing blade mechanism is reset by a clockwise rotation of the brake lever 96 when the arm 96a of the brake lever is pushed by the stud pin 66a on the under-side surface of the cam 66.

During the time when the pin 10a in FIG. 2 is pushing the cam 11, the pin 30 in FIG. 3 is rotating clockwisely and the pin 31a counter-clockwisely. Therefore, the pin 30 abuts against the lever 42 and pushes it. The lever 42 is rotated counter-clockwisely against the force of the spring 50. However, at the time, since the lever 43 is in abutment with the pin 51 and cannot move, the pin 44 is inactive and the mirror remains stationary. After the pin 30 has passed over, the lever 42 returns to the position shown in FIG. 3 because the spring 50 has a stronger biasing force than the spring 49.

With the counter-clockwise rotation of the pin 31a, the lever 201 is again apart from the pin 31a and the angled portion 201b of the lever abuts against the angled portion 205c of the lever 205. Before the roller 36 falls down in the stepped portion 32a of the cam 32, the pin 31a pushes the arm 205a to rotate the lever 205 clockwisely against the force of the spring 206. The angled portion 205c and the angled portion 201b are separated from each other and instead the latter gets into engagement with the side surface 205d of the lever 205. After a further counter-clockwise rotation, the pin 31a leaves the arm 205a of the lever. Even after the disengagement of the arm 205a from the pin 31a, the lever 205 remains stopped by the angled portion 201b at the position rotated clockwisely. A certain time after, the roller 36 falls down in the stepped portion 32a of the cam 32. At the time, the lever 35 intends to rotate clockwisely by the biasing force of the spring 48. However, the clockwise rotation of the lever 35 is limited by the angled portion 205b of the lever 205 lying in the course of rotation of the arm 35c of the lever. Accordingly, the pawl 39a remains unmoved and keeps the position for locking the lever 157 as shown in FIG. 5.

By previously rotating the lever 169 counter-clockwisely against the force of the spring up to the position in which the hook portion 169c of the lever can engage with the arm 164c, it is possible to prevent the lever 164 from rotating even when the current to the armature 154 is cut off after the starting operation of a picture-taking. By the starting operation, the opening blade group is actuated, but the closing blade group does not start running at the time because the lever 164 can not rotate. The lever 164 is allowed to rotate first when the lever 169 is rotated clockwisely after the lapse of a determined time. At the time, the closing blade group starts running. After that, the above-described steps of operation are carried out and one cycle of picture-taking operation is completed.

In the embodiment particularly described above, when brake means 96 and driving means for the closing blade mechanism have completely been reset, the closing blade group 76-80 is not in the position shown in FIG. 9D but in the position shown in FIG. 9A. As seen from the figures, the position shown in FIG. 9D is a position in which the closing blade group covers the aperture perfectly. In FIG. 9A, the closing blade group 76-80 is in a position a little moved upwardly from the position in FIG. 9A.

In other words, said brake means and driving means are resetable by setting the closing blade group in an imperfectly expanded position. Even when the closing blade group is in such an imperfectly expanded position, the shutter device according to the present invention is able to perform a sufficient effect to shut the aperture from light. This is because the bondary portions between every two neighbouring blades of the opening blade group, namely the areas between blades 127 and 128; 128 and 129; and 129 and 130 are covered well by the respective blades of the closing blade group as seen in FIG. 9A.

While the invention has been particularly shown and described with reference to a preferred embodiment thereof, it is to be understood that various changes and modifications are possible therein without departing from the scope of the present invention.

We claim:

1. A focal plane shutter for camera comprising:
    an opening blade group and a closing blade group, each consisting of thin opaque blades to be expanded and foled for closing and opening an exposure aperture;
    an opening blade-driving member connected with said opening blade group and movable between the cover position in which the opaque blades of said group are expanded and the open position in which said opaque blades are folded up;
    a closing blade-driving member connected with said closing blade group and movable between the cover position in which the opaque blades of said group are expanded and the open position in which said opaque blades are foled up;
    exposure operation means for moving said opening blade-driving member from the cover position to the open position and the closing blade-driving member from the open position to the cover position for an exposure operation;
    a braking member connectable with the closing blade-driving member moving from the open position to the cover position and able to change its position from an initial position while absorbing the kinetic energy of said moving driving member; and
    resetting means for moving said opening blade-driving member to the cover position, said closing blade-driving member to a determined position between the cover position and the open position and said braking member to the initial position after the completion of the exposure operation.

2. A focal plane shutter for camera according to claim 1, wherein, when the closing blade-driving member has been moved to the determined position by said resetting means, the closing blade group is expanded to such an extent in which at least the boundary areas between opaque blades of the opening blade group expanded in link with the opening blade-driving member can be covered and the exposure aperture can be partially closed by said closing blade group.

3. A focal plane shutter for camera according to claim 1, wherein said resetting means includes means for latching the closing blade-driving member after moved to said determined position.

4. A focal plane shutter for camera according to claim 1, which further comprises means for moving the closing blade-driving member from said determined position to the open position prior to the exposure operation.

5. A focal plane shutter for camera comprising:
    an opening blade group and a closing blade group, each consisting of thin opaque blades to be moved between the cover position for closing an exposure aperture and the open position retracted from the aperture;
    an opening blade-driving member connected with said opening blade group for moving the latter;
    a closing blade-driving member connected with said closing blade group for moving the latter;
    first operation means for operating said opening blade-driving member in such manner that said opening blade group is moved from the cover position to the open position for an exposure operation and after completing the exposure operation said opening blade group is moved from the open position to the cover position; and
    second operation means for operating said closing blade-driving member in such manner that said closing blade group is moved from the open position to the cover position for an exposure operation and after completing the exposure operation, said closing blade group is moved from the cover position to a determined position between the cover position and the open position; said closing blade group in said determined position being able to cover at least partially the exposure aperture in such manner that at least the boundary areas between opaque blades of the opening blade group in the cover position can be covered.

6. A focal plane shutter for camera according to claim 5, wherein said second operation means comprises means for moving the closing blade-driving member after completing the exposure operation and means for latching the closing blade-driving member after moved to the position corresponding to said determined position of the closing blade group.

7. A focal plane shutter for camera according to claim 5, wherein said second operation means operates the closing blade-driving member to move the closing blade group from said determined position to the open position prior to the exposure operation.

8. A focal plane shutter for camera comprising:
    an opening blade member and a closing blade member to be moved between the cover position for closing an exposure aperture and the open position retracted from the aperture in a plane parallel to the plane containing said aperture, wherein said openign blade member reaches the open position by moving in a first direction;
    a driving means connected with the opening blade member and movable between the first and second positions to move the opening blade member in the first direction, said driving means being biased toward the second position;
    first holding means for holding the driving member in the first position;
    a balance weight member movable in a second direction opposite to said first direction from an initial position within a plane parallel to said plane, said balance weight member being biased toward the second direction;
    second holding means for holding the balance weight member in the initial position; and
    timing means for operating said first and second holding means at a determined timing to cancel the holding of the driving member and the balance weight member.

9. A focal plane shutter according to claim 8, wherein said timing means operates said second holding means after the holding of the driving member by said first holding means has been cancelled.

10. A focal plane shutter according to claim 8, wherein said timing means includes a moving member for changing its position for the exposure operation and means for letting said first and second holding means respond to said moving member.

* * * * *